US006890130B2

(12) United States Patent
Trochon

(10) Patent No.: US 6,890,130 B2
(45) Date of Patent: May 10, 2005

(54) TIRE MACHINING TOOL

(75) Inventor: Francois Trochon, Chamalieres (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 90 days.

(21) Appl. No.: 10/132,622

(22) Filed: Apr. 25, 2002

(65) Prior Publication Data

US 2002/0166642 A1 Nov. 14, 2002

(30) Foreign Application Priority Data

Apr. 26, 2001 (FR) .......................................... 01 05781

(51) Int. Cl.[7] .......................... B26D 1/12; B27G 15/00; B23C 1/00

(52) U.S. Cl. .......................... 407/64; 407/63; 408/199; 409/230

(58) Field of Search .......................... 407/53, 56, 61, 407/62, 64; 409/165, 166, 199; 408/227, 229, 230

(56) References Cited

U.S. PATENT DOCUMENTS

| | | | | |
|---|---|---|---|---|
| 2,132,835 A | * 10/1938 | Stevens | ....................... | 157/13 |
| 3,426,828 A | 2/1969 | Neilsen | ....................... | 157/13 |
| 3,765,789 A | * 10/1973 | Hougen | ....................... | 408/204 |
| 3,831,236 A | 8/1974 | Coburn et al. | ............ | 29/103 R |
| 4,036,275 A | 7/1977 | Branick | ....................... | 157/13 |
| 4,915,182 A | * 4/1990 | Magyari et al. | ............ | 175/403 |
| 5,054,971 A | 10/1991 | Kieninger et al. | .......... | 408/205 |
| 5,791,837 A | * 8/1998 | Johnson | ....................... | 408/204 |
| 6,062,950 A | 5/2000 | Morgan | ....................... | 451/28 |

OTHER PUBLICATIONS

International Publication WO 00/15388, "Dual Wheel Tire Grinder," Mar. 23, 2000.

* cited by examiner

*Primary Examiner*—Daniel W. Howell
*Assistant Examiner*—Brian D. Walsh
(74) *Attorney, Agent, or Firm*—Cohen, Pontani, Lieberman & Pavane

(57) ABSTRACT

A cylindrical cutting tool for a tire detreading or machining machine, the circular blade of which has a beveled cutting edge, wherein the cutting edge is interrupted by at least one notch, that is to say a portion having a lower axial height than the cutting edge.

10 Claims, 3 Drawing Sheets

TIRE MACHINING TOOL

BACKGROUND OF THE INVENTION

1. Technical Field of the Invention

The present invention relates to a tool for machining viscoelastic products; more precisely, it relates to a cylindrical cutting tool for a machine for detreading and machining rubber products such as tires.

2. The Related Art

Tires are known to comprise a tread consisting of an outer layer of rubber-based mixtures, of greater or lesser thickness, in which are molded various grooves and tread patterns intended, inter alia, to improve the vehicle's grip relative to the ground.

In certain cases, it is necessary to machine the outer surface of the tire: for example, to prepare for retreading of a worn tire or, indeed, to obtain a "worn" tire from a new tire, with a view to performing certain tests on the rigid belt, or on the carcass, without being hampered by the very considerable heating associated with the thickness of the rubber of the new tread during the tests.

In the first case (retreading), tires are machined by abrasion (see for example International Publication No. WO 00/15388), but this process causes superficial heating which it is sometimes desirable to avoid. Moreover, a good surface state is sometimes required; a cutting process is then used. In general, the tire is made to turn about its axis and is moved towards the tool by translational movement of part of the frame (see for example U.S. Pat. No. 4,036,275).

The cutting tools used are generally cylindrical, that is to say, the cutting edge of the blade is circular, and they are rotationally mobile about their axes in order to improve cutting (see for example U.S. Pat. No. 3,426,828). The cut material passes inside the cylindrical tool and is discharged in the form of a strip of greater or lesser length depending on the tread pattern of the tire. In the case of a heavy goods vehicle tire, with longitudinal ribs, the length of the strip may reach several meters and even exceed meters, which poses discharge problems and may also cause jams.

SUMMARY OF THE INVENTION

The present invention relates to an improved cylindrical cutting tool which automatically ensures that the strip of cut material is divided into portions in order to prevent jamming.

A cylindrical cutting tool for a tire detreading or machining machine, the circular blade of which has a beveled cutting edge interrupted by at least one notch, that is to say, a portion having a lower axial height than the cutting edge, wherein the notch in the cutting edge is obtained by means of a groove machined into the cylindrical surface of the tool situated on the sharp side of the cutting edge.

Preferably, in a cylindrical cutting tool according to the invention, the cutting edge comprises a plurality of notches which separate circumferential segments of the cutting edge of substantially the same length, the notches and segments thus being disposed alternately at different axial heights.

Production of the notches by machining grooves on the sharp cutting edge side of the tool has the advantage of allowing strict maintenance of the profile of the notches during successive sharpening operations of the cutting edge.

Preferably, the grooves are distributed circumferentially in a regular manner, i.e., at a regular spacing.

In a preferred variant of the cylindrical cutting tool according to the invention, the notches of the circular cutting edge are obtained by means of longitudinal grooves machined into the cylindrical surface of the tool situated on the sharp side of the cutting edge.

The notches of the circular cutting edge may also be obtained by means of helical grooves machined into the cylindrical surface of the tool situated on the sharp side of the cutting edge.

The angle of the cutting edge of the tool is between 15° and 20° and preferably is substantially equal to 18° 30'.

When the cutting edge is machined on the outer cylindrical surface of the tool, the grooves are machined into the outer cylindrical surface.

When the cutting edge is machined on the inner cylindrical surface of the tool, the grooves are machined into the inner cylindrical surface.

In a preferred variant, the number of grooves is of the order of 20 and their width is of the order of 5 mm.

BRIEF DESCRIPTION OF THE DRAWINGS

An example of an embodiment of the improved tool according to the invention will be described, in non-limiting manner, with reference to the attached drawings, in which.

DESCRIPTION OF EXEMPLARY EMBODIMENTS

Figure 1:
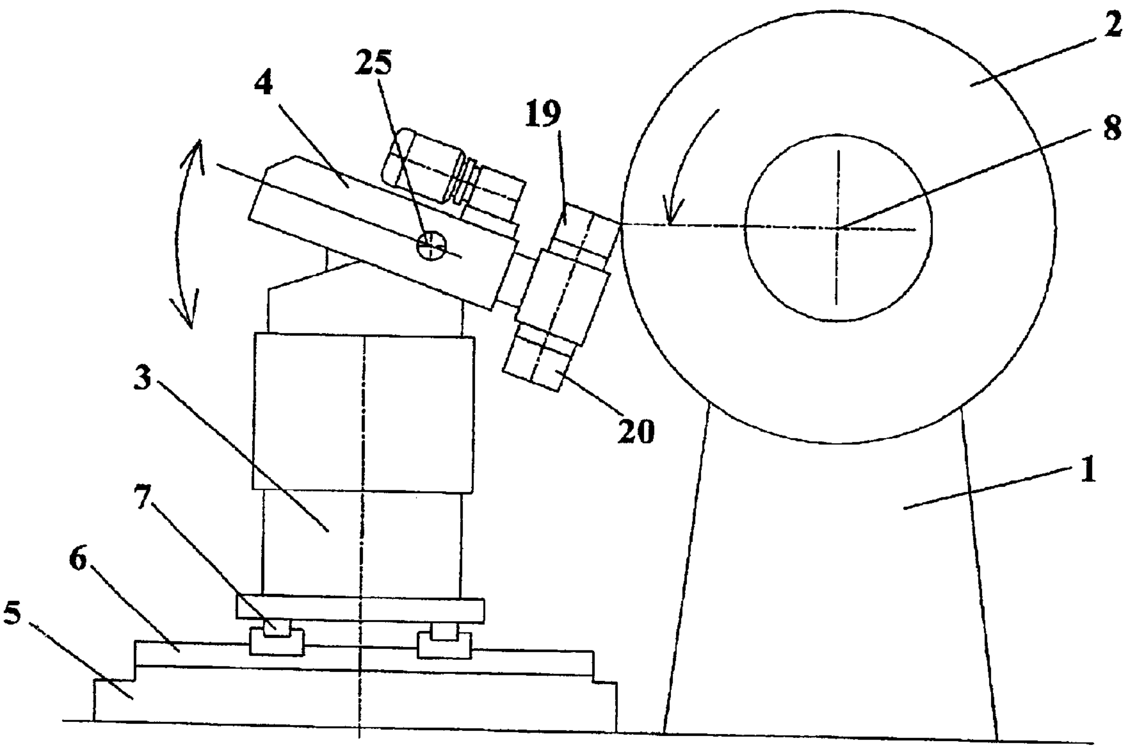
FIG. 1 is a schematic view of a tire machining machine comprising a tool according to the invention.

FIG. 1 is a highly schematic view of a machine for machining tire treads comprising a cutting tool according to the invention. The machine comprises a first fixed frame 1 supporting a drum (not shown) on which is mounted a tire 2. The machine also comprises a mobile frame 3 supporting a tool holder 4. The frame 3 is mounted on a fixed base 5 by means of two pairs of horizontal rails 6 and 7. The rails 6 are oriented perpendicularly to the axis of rotation 8 of the tire and permit translational movement of the frame 3 towards or away from the tire 2. The rails 7 are oriented parallel to the axis of rotation 8 of the tire and permit translational displacement of the frame 3 parallel to the axis of rotation of the tire 2. The combination of these two translational movement allows the cutting tool to follow all the conventional tire profiles. The frame 3 also allows vertical displacement of the tool holder 4, due to conventional means which are not shown. The machine additionally comprises means (not shown) of setting the tire 2 in rotation, of reversing its direction of rotation and of controlling the displacements of the mobile frame 3 and the vertical position of the tool holder 4. Such means are also conventional.

The tool holder 4 is intended to hold a cutting tool comprising two cylindrical cuffing tools 19 and 20. FIG. 1 shows the tool 19 in position for machining the tire 2. The tool holder 4 may swing vertically about the horizontal axis 25 to bring the cutting edge of the tool 20 into contact with the tire 2 and, if necessary, to allow careful deflashing of the age tread of the tire 2.

The machine shown in FIG. 1 may use tools 19 and 20 with cylindrical cutting edges. It may also advantageously use tools according to the invention as described below.

Figure 2:
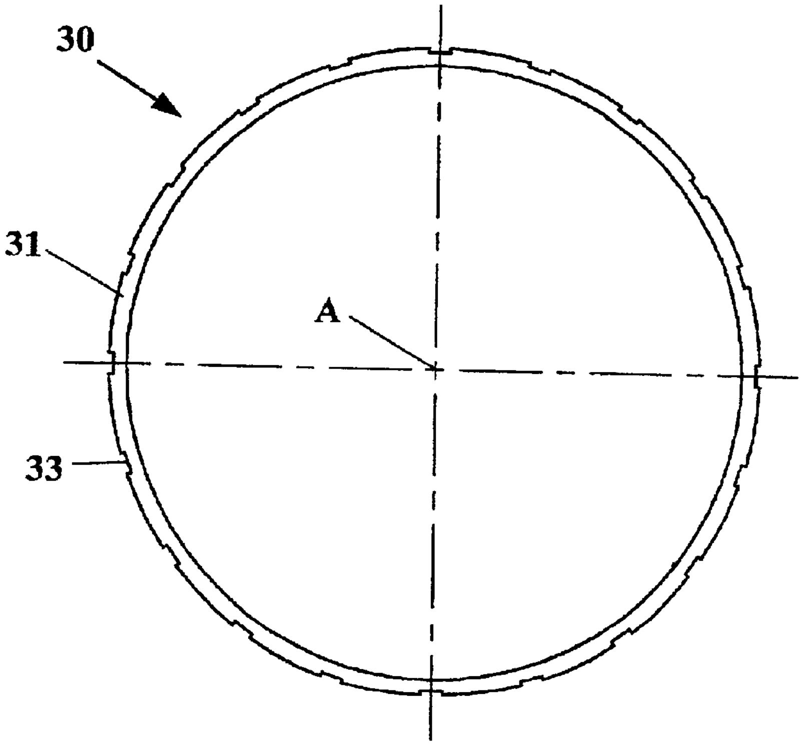
FIG. 2 is a view from above of a first embodiment of an improved cutting tool.
Figure 3:
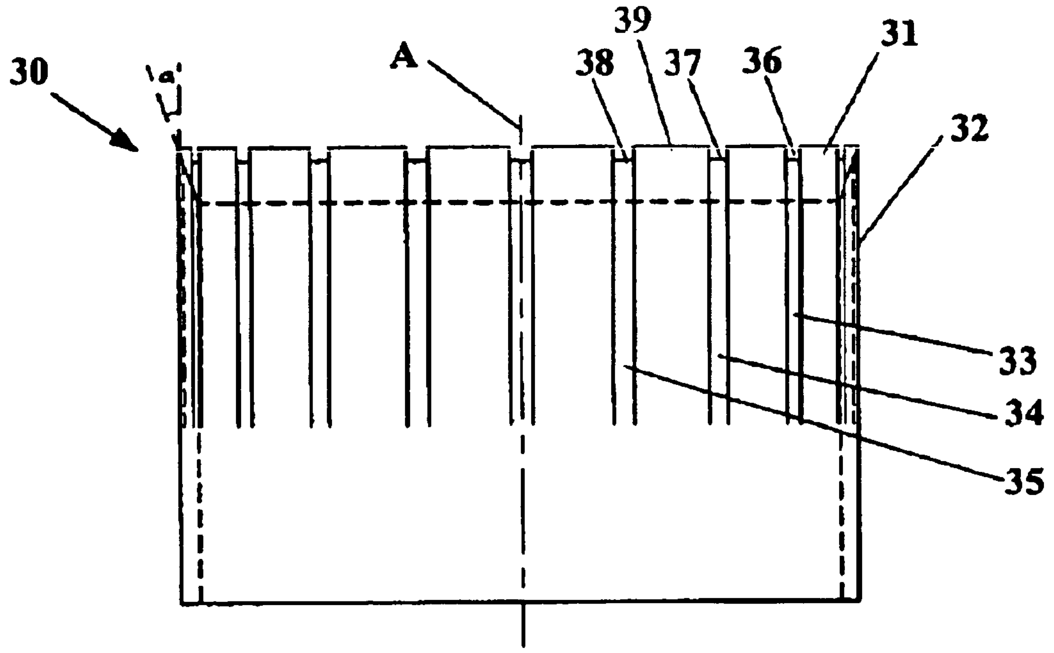
FIG. 3 is a view from the side of the tool of FIG. 2.

FIGS. 2 and 3 show a view from above, on the cutting edge side (FIG. 2) and a view from the side (FIG. 3) of a first embodiment of a tool 30, similar to the tools 19 and 20, according to the invention. The tool 30 is generally cylindrical in form, that is to say, the cutting edge 31 of the blade thereof is circular. In the example illustrated, the diameter of the tool 30 is 150 mm, and the bevel of the cutting edge 31 forms with the axis A of the tool 30 an angle alpha substantially equal to 18° 30'.

In the example described, the cutting edge 31 has its sharp side on the outer cylindrical surface 32 of the tool 30.

In accordance with the invention, the surface 32 is machined in such a way as to exhibit a certain number of grooves, such as 33, 34, 35, distributed circumferentially in a regular manner. The grooves open, at the level of the cutting edge 31, in notches, such as 36, 37, 38, which separate circumferential segments of the same length, such as 39, of the cutting edge.

In the example described, there are 20 grooves and thus 20 notches and 20 segments, each groove and, thus each notch, having a width of 5 mm.

Figure 5:
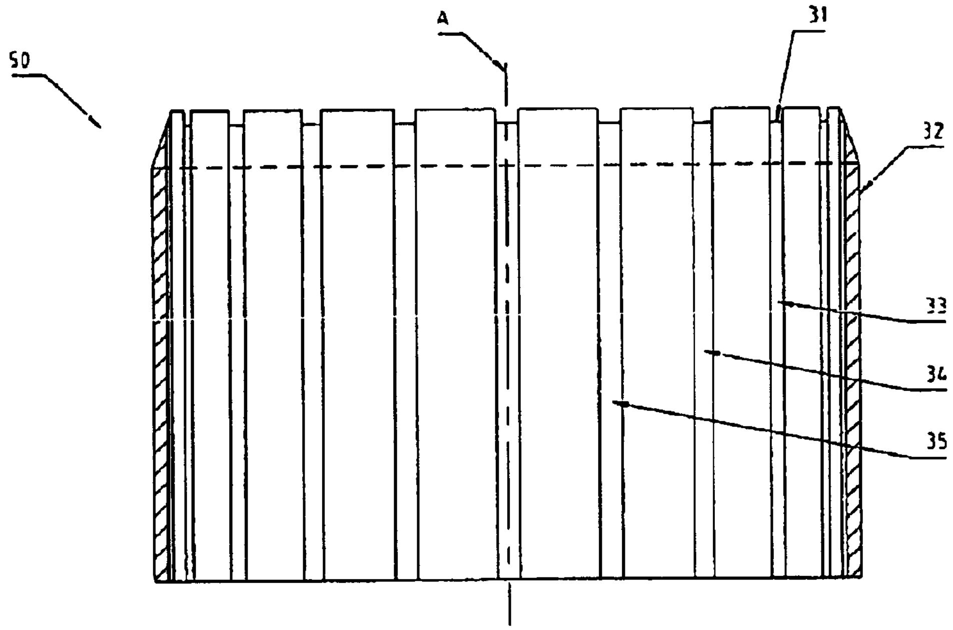
FIG. 5 is a view from the side of another embodiment of an improved cutting tool according to the invention.
Figure 6:
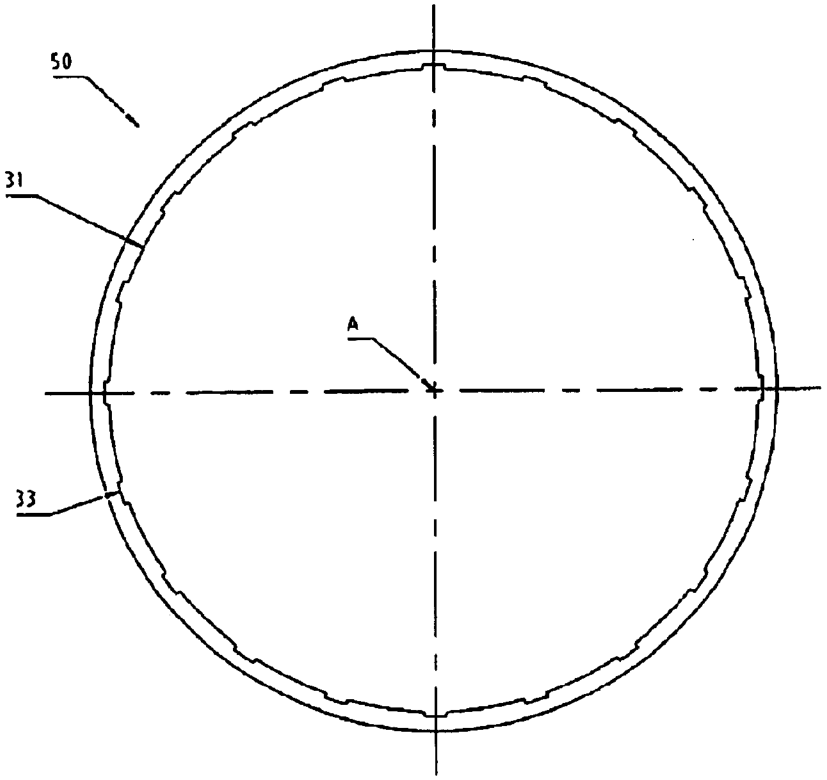
FIG. 6 is a view from above of the tool of FIG. 5.

In a variant shown in FIGS. 5 and 6, the a cutting tool 50 includes a sharp side of a cutting edge 31 located on an inner cylindrical surface of the tool. In that case, the grooves 33, 34, 35 are machined on the same inner surface, and the grooves 33, 34, 35 open, at the level of the cutting edge 31, in notches which are regularly distributed, according to the invention.

The axial length of the grooves, such as 33, 34, 35, is not necessary identical to that of the tool 30. The person skilled in the art may select the length which seems to him/her the most economic in view of the successive cutting edge sharpening operations.

Production of the notches by machining grooves on the sharp cutting edge side of the tool has the advantage of allowing strict maintenance of the profile of the notches during successive sharpening operations of the cutting edge.

Figure 4:
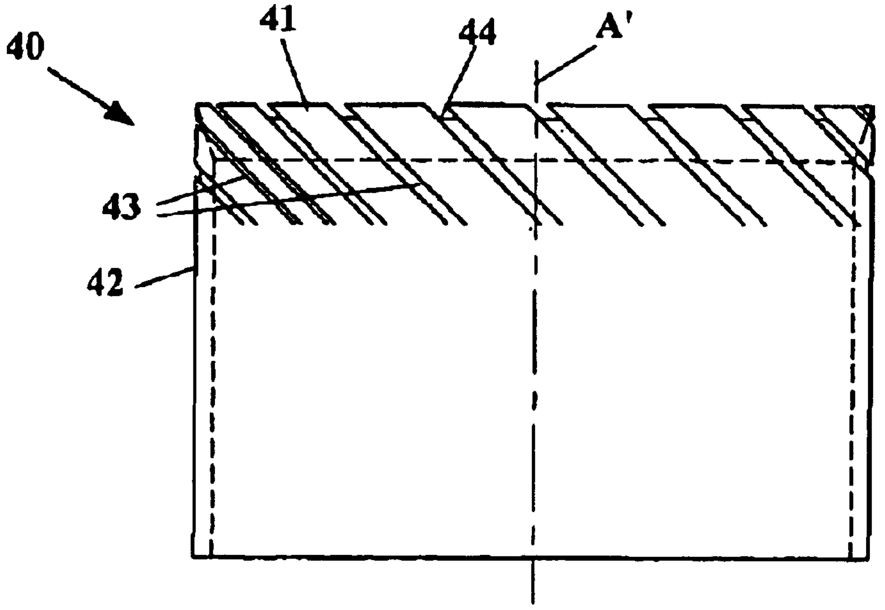
FIG. 4 is a view from the side of a second embodiment of a cutting tool according to the invention.

FIG. 4 is a view from the side of a variant 40 of the cutting tool according to the invention. In this variant, it may be seen that the grooves 43 on an outer cylindrical surface 42 of the tool 40 are helical instead of axial. Each notch 44 thus has inclined edges instead of normal edges, as is the case with the tool 30. This effectively provides the cutting edge 41 of the tool 40 with a leading edge and a trailing edges, which may facilitate severing of the cut strips.

Operation of the improved tool according to the invention is as follows: the strip of material which has just been cut by a segment of the cutting edge of the tool is no longer cut by the following notch, traction thereby being exerted on the strip due to the relative movement of the tire and the tool; this traction affecting the strip automatically causes its division into much shorter pieces, which removes the risk of jamming at the level of the cutting tool.

With a speed of tire rotation of the order of 100 to 500 rev/min, a tire diameter of the order of 1 m and a speed of tool rotation of the order of 55 rev/min, portions are obtained which are approximately 50 cm in length, instead of several meters.

What is claimed is:

1. A cylindrical cutting tool for a machine for detreading or machining tires, said tool having a circular blade comprising:

an inner cylindrical surface, an outer cylindrical surface a beveled, circular cutting edge end having a forward, sharp edge on one of said inner and outer cylindrical surfaces, and a rearward edge on the other, at least one groove formed in only said one of said inner and outer cylindrical surfaces and extending to said sharp edge, and a notch formed where said at least one groove meets said beveled cutting end, said notch interrupting said sharp edge.

2. A cylindrical cutting tool according to claim 1, in which said one of said inner and outer cylindrical surfaces comprises a plurality of said grooves and a corresponding plurality of said notches which separate circumferential segments of the cutting edge of substantially the same length, said notches and segments thus being disposed alternately at different axial heights.

3. A cylindrical cutting tool according to claim 2, in which said plurality of grooves are evenly distributed circumferentially on said one of said inner and outer cylindrical surfaces.

4. A cylindrical cuffing tool according to claim 2, in which the notches are obtained by means of longitudinal grooves machined into said one of said inner and outer cylindrical surfaces and extending to said sharp edge.

5. A cylindrical cutting tool according to claim 2, in which the notches are obtained by means of helical grooves machined into said one of said inner and outer cylindrical surfaces and extending to said sharp edge.

6. A cylindrical cutting tool according to claim 2, in which the sharp edge of the cutting end is on the outer cylindrical surface of the tool, and the grooves are machined into said outer cylindrical surface.

7. A cylindrical cutting tool according to claim 2, in which the sharp edge of the cutting end is on the inner cylindrical surface of the tool, and the grooves are machined into said inner cylindrical surface.

8. A cylindrical cutting tool according to preceding claim 2, in which a diameter of the tool is approximately 150 mm, the number of said grooves is 20 and a width of each of said grooves is approximately 5 mm.

9. A cylindrical cuffing tool according to claim 1, in which the beveled cutting end extends at an angle alpha between 15° and 20° relative to a longitudinal axis of the cutting blade.

10. A cylindrical cutting tool according to claim 9, in which the angle alpha of the beveled cutting end is substantially equal to 18° 30'.

* * * * *